(12) United States Patent
Kantecki et al.

(10) Patent No.: US 11,050,682 B2
(45) Date of Patent: Jun. 29, 2021

(54) REORDERING OF DATA FOR PARALLEL PROCESSING

(71) Applicant: Intel Corporation, Santa Clara, CA (US)

(72) Inventors: Tomasz Kantecki, Ennis (IE); Niall Power, Limerick (IE); John J. Browne, Limerick (IE); Christopher MacNamara, Limerick (IE); Stephen Doyle, Clare (IE)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 15/719,081

(22) Filed: Sep. 28, 2017

(65) Prior Publication Data

US 2019/0097951 A1    Mar. 28, 2019

(51) Int. Cl.
*H04L 12/861* (2013.01)
*H04L 12/883* (2013.01)
*H04L 12/801* (2013.01)
*H04L 12/935* (2013.01)

(52) U.S. Cl.
CPC .......... *H04L 49/9057* (2013.01); *H04L 47/34* (2013.01); *H04L 49/9021* (2013.01); *H04L 49/3045* (2013.01)

(58) Field of Classification Search
None
See application file for complete search history.

(56) References Cited

U.S. PATENT DOCUMENTS

2014/0036909 A1* 2/2014 Veal ...................... G06F 9/3887
370/389

* cited by examiner

*Primary Examiner* — Ayaz R Sheikh
*Assistant Examiner* — Sori A Aga
(74) *Attorney, Agent, or Firm* — Patent Capital Group

(57) ABSTRACT

A network interface device, including: an ingress interface; a host platform interface to communicatively couple to a host platform; and a packet preprocessor including logic to: receive via the ingress interface a data sequence including a plurality of discrete data units; identify the data sequence as data for a parallel processing operation; reorder the discrete data units into a reordered data frame, the reordered data frame configured to order the discrete data units for consumption by the parallel operation; and send the reordered data to the host platform via the host platform interface.

26 Claims, 10 Drawing Sheets

REORDERING OF DATA FOR PARALLEL PROCESSING

FIELD OF THE SPECIFICATION

This disclosure relates in general to the field of communication, and more particularly, though not exclusively, to a system and method for reordering of data for parallel processing.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
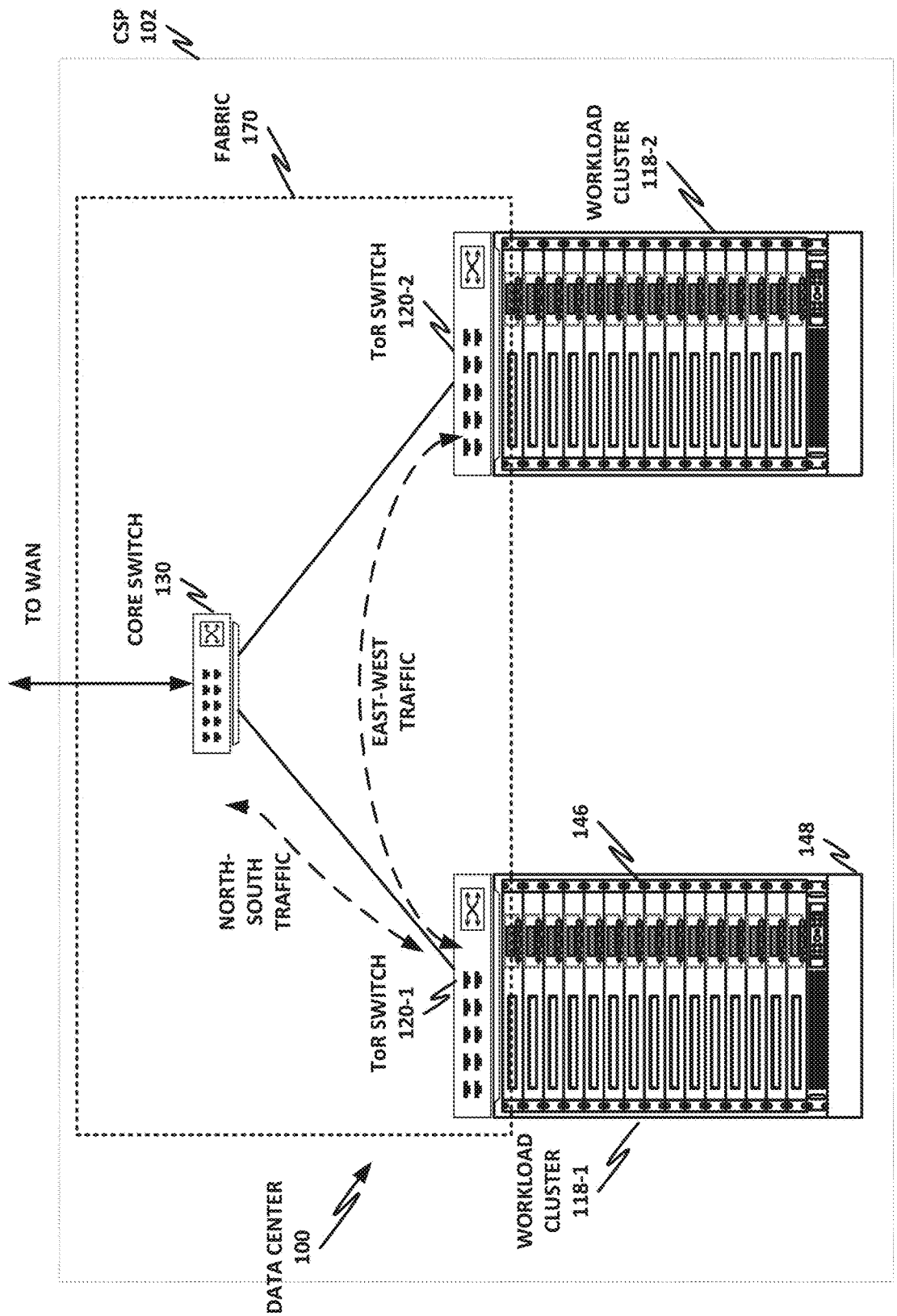
FIG. 1 is a network-level diagram of a data center of a cloud service provider, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In a modern data center, different virtualized network function (VNF) applications may process packet data in many different ways. The way that the applications process packets may not coincide with the way the packets arrive on a network. Thus, data may need to be formatted or transformed into an application-friendly format for the software to operate on it.

A vector or single instruction, multiple data (SIMD) application may require packets to be reordered into a vector or SIMD-friendly format to allow the application to make use of SIMD instructions such as those found in Intel® processors.

In SIMD operations, a single instruction is sent to a number of processing elements of the digital signal processor, where each processing element can perform a same operation on different data. To achieve high-data throughput, memory organization of digital signal processors (DSPs) having SIMD architectures (or other processor supporting parallel processing) support multiple, synchronous data accesses. In an example, a processor architecture may include a multi-banked memory interconnected by a memory interconnect network architecture to the processing elements, such that more than one data operand can be loaded for (accessed by) the processing elements during a given cycle.

The memory interconnect network architecture typically includes an interconnection network for every respective parallel data transfer. For example, if two parallel data transfers from the memory to the processing elements are needed to perform an operation, the memory interconnect network architecture implements an interconnection network for transferring a first data set from the memory to the processing elements and another interconnection network for transferring a second data set from the memory to the processing elements.

SIMD can be very useful in contexts such as neural networks, image processing, ciphering Internet Protocol security (IPsec) using multibuffer or SIMD instructions, and compression. Thus, it is advantageous to optimize SIMD-type instructions for these important types of workloads.

Embodiments of the present specification provide a packet preprocessor comprising a coprocessor, such as within a network interface card (NIC), that can identify packets intended for vector or SIMD processing, and reorder those packets into an application-friendly format. This prepares the packets for later use in SIMD, multiple instruction, multiple data (MIMD), or vector operations. In particular, the packet preprocessor reorders packets for parallel processing. As used throughout this specification, a parallel processing operation may include, by way of nonlimiting example, SIMD, MIMD, and vector processing. The packet preprocessor may be configured (via a configuration interface for a core of the host platform) to identify certain frames, groups of frames, or packets, referred to herein broadly as a "data sequence." The data sequence may include a plurality of discrete data units, such as packets, bytes, data words, or other units. Generally, the discrete data units may be divisible from the data sequence, and in a SIMD application, each parallel computing path may receive a single discrete data unit from the data sequence.

The packet preprocessor may transform and/or transpose the discrete data units within the data sequence in advance of the application receiving the data sequence, thus helping to optimize application performance.

For purposes of the present specification, a network interface may also be provided by way of nonlimiting example via Ethernet, WiFi, a modem, a hardware computer port, a network interface device, a network socket, or a protocol port interface.

In certain existing systems, input/output (IO) packets are received in separate buffers in memory, and the applications may then need to load, shift, move, and perform exclusive/or (XOR) operations to transform data into a format so that it can be used efficiently in vector or SIMD-type operations. This may be done in software, thus increasing latency through the system and decreasing the throughput.

Digital data transmission units known as "frames" (a species of data sequence) may be used to indicate to a receiver the beginning and end of payload data. Data may consist of sequences including pluralities of discrete data units, to be received via an ingress interface. A data frame may contain metadata identifying the data frame as ready for consumption by a parallel processing operation. A virtual queue may be utilized to queue a plurality of reordered data frames to a target core of a host platform. Additionally, a vector switch may be used to switch the reordered data frame to the target core on the host platform.

Embodiments of the present specification provide inline or in-data path splits of single data packets or segmented and reordered data frames into a plurality of buffers and transposition of the data into a format that is suitable for SIMD or vector processing. Transposition includes transformation of the data, such as bit shuffling, bit position reordering, bit inversion, bit shuffling, and other bit operations and combinations, within and between buffers. Thus, when SIMD or vector-based software packages receive the packets, the data are already in condition for the appropriate processing. The packet preprocessor can provide the transposed data, the transposed data with the original data, or as a combination, selectable for any combination of packet attributes such as virtual local area network (VLAN), Internet Protocol (IP) tuple, or protocol type by way of nonlimiting example.

In the foregoing example, transposition may also include transformation of the data, such as bit shuffling, bit position reordering, bit inversion, bit shuffling and other bit operations and combinations, within and between buffers. For example, data may be received from the network in network order (e.g., data words may be in big-endian format), while Intel® processors generally operate in little-endian bite order. Thus, the packet pre-processor may support operations on the buffers that are combinations or multiple transformation passes. For example, it may change the packet byte order from network order (big-endian) to processor order (little-endian), followed by the data transformation to suit the SIMD/vectors instructions as described above. Thus, multiple passes (combinations) of bit, byte and word operations may be supported Additionally, embodiments of the present specification support single packet data transmission for vector processing as well as single packet data transformations followed by segmentation into multiple buffers. Embodiments also support multiple packet coalescing, transformation, and delivery as a single buffer. Embodiments may support distribution of segments to different cores, where they can be handled in separate threads, on separate cores.

Some embodiments of the present specification may include a common networking workflow, wherein a sequence of packets comes into an edge router within a service provider data center, and the edge router performs some packet processing pipeline on the packet. Consider the example of a network service provider. A data over cable service interface specification (DOCSIS) modem may sit at the edge of a small-scale data center that provides the Internet access to end users or clients. As a packet comes in, the DOCSIS modem applies the packet processing pipeline to the packet, such as filtering, classifying, performing lookups, initiating security sequences, or other functions.

A system and method for reordering of data for parallel processing will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a data center 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a network interface card (NIC), an Intel® Host Fabric Interface (HFI), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/Internet Protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
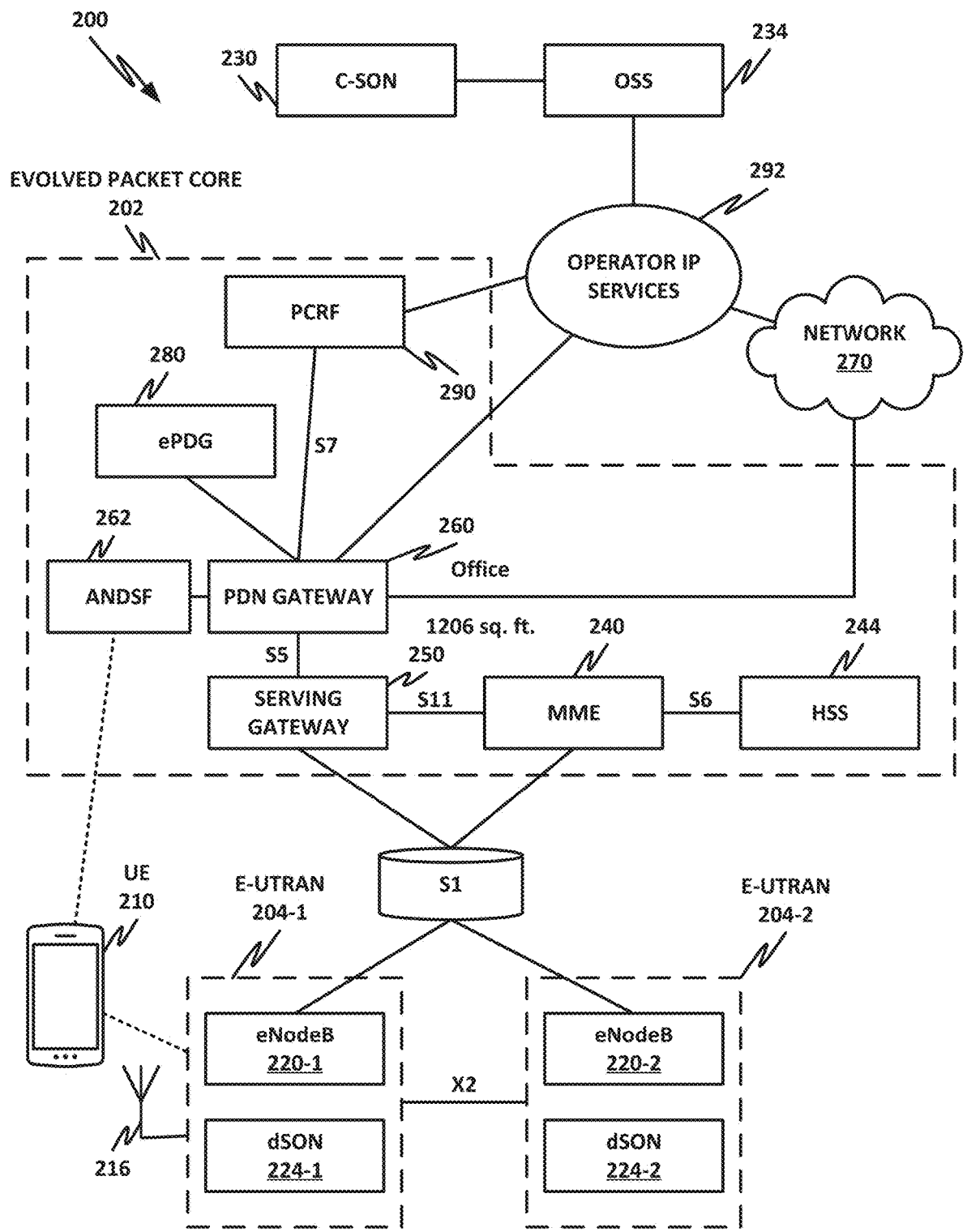
FIG. 2 is a block diagram of a mobile network, according to one or more examples of the present specification.

FIG. 2 is a block diagram of a mobile network 200 according to one or more examples of the present specification. In this specific example, a fourth-generation long-term evolution (4G LTE, or simply LTE) network is disclosed by way of non-limiting example. In certain embodiments, LTE is used primarily for data transfer, so that mobile network 200 may also provide, in addition to the elements shown here, structure for handling voice communication, which may communicatively couple to a public-switched telephone network (PSTN). In some cases, voice over LTE (VoLTE) may also be provided. It should also be noted that LTE is disclosed only as one possible embodiment of the teachings of this Specification, and that the teachings may be relevant to other telecommunication structures now in existence or later developed, and the scope of this Specification is intended to encompass such structures where applicable.

In this example, mobile network 200 includes user equipment (UE) 210 communicatively coupled, for example via a wireless antenna 216, to an evolved UMTS radio access network (E-UTRAN) 204. UE 210 may initiate a data transaction or session with E-UTRAN 204-1, referred to herein as a "data call." E-UTRAN 204 communicatively couples to an evolved packet core (EPC) 202, for example via wired connections. E-UTRAN 204 may include, by way of non-limiting example, an evolved NodeB (eNB) 220, which acts as a wireless base station, and a distributed self-organizing network (dSON) controller 224.

In various embodiments, these functions may be provided by dedicated servers or appliances. In other embodiments, select functions may be provided in virtual environments, such as a rack-mounted server providing various functions in a hypervisor. In a general sense, the various UE-class devices, server-class devices, network functions, may be generally classified as "computing devices." As used throughout this Specification, a computing device includes any electrical or electronic device based on the Von Neumann architecture, including a processor with a control unit and logic unit, and a memory. In that context, it should be understood that the Von Neumann architecture may be provided either as a physical device, or as a virtual machine or hypervisor running at one or more layers of abstraction from the physical hardware.

In this example, two E-UTRANS 204-1 and 204-2 are disclosed to illustrate the mobile nature of the network. UE 210 may move, for example, as a user carrying UE 210 moves. As UE 210 moves farther away from E-UTRAN 204-1, its signal to E-UTRAN 204 will attenuate. If UE 210 simultaneously moves closer to E-UTRAN 204-2, its signal with E-UTRAN 204-2 will become stronger. When UE 210 has moved such that it gets a stronger signal to E-UTRAN 204-2 than to E-UTRAN 204-1, E-UTRAN 204-1 may hand off the data call to E-UTRAN 204-2, so that E-UTRAN 204-2 seamlessly continues handling the data call.

Handoff may be handled over the X2 interface. In this example, two classes of signals are passed within mobile network 200: voice, data, and call signals (referred to herein as the "user plane" signals) and control signals (referred to herein as the "control plane" signals). X2 provides both a control plane interface and a user plane interface, and in an embodiment is a wired connection between the two E-UTRANs 204. The protocol structure of the S1 control plane is based on stream control transmission protocol/Internet Protocol (SCTP/IP). The user plane provides a protocol structure based on general packet radio service (GPRS) tunneling protocol/user datagram protocol/IP (GTP/UDP5/IP). On the user plane, a transport bearer may be identified by an IP address and one or more GTP tunneling endpoint IDs (TEID). X2 operates as a meshed interface, meaning that a plurality of eNBs 220 may all be linked together. Properly configured, X2 helps to minimize packet loss as UE 210 hands off from one E-UTRAN 204 to another. Specifically, when the data call is handed off, unsent or unacknowledged packets stored in the old eNB 220's queues can be forwarded or tunneled to the new eNB 220 via the X2 interface.

E-UTRANs 204 communicatively couple to an EPC 202 via an S1 interface. As with the X2 interface, S1 provides both a control plane and a user plane, configured similarly to the respective X2 control plane and user plane. In an embodiment, the S1 application protocol (S1-AP) is mapped directly on top of SCTP.

In this example, EPC 202 includes a serving gateway (SGW) 250, a mobility management entity (MME) 240, a home subscriber server (HSS) 244, a packet data network (PDN) gateway 260, an evolved packet data gateway (ePDG) 280, and policy and charging rules function (PCRF) 290. EPC 202 for its part may communicatively couple, via appropriate interfaces, to a public network such as internet 270, or to operator IP services 292.

When UE 210 is performing data operations, such as web applications, web surfing, e-mail, or other network operations, UE 220 connects to Internet 270 via mobile network 200. In one example scenario, user plane signals originate from UE 210 and are passed to E-UTRAN 204. Within E-UTRANs 204, user plane signals are first received by eNB 220 (or other similar base station), which interfaces with EPC 202 to handle the data call.

As a wireless local area network (WLAN) access point (WAP), eNB 220 supports Layer 1 and Layer 2 of the E-UTRAN orthogonal frequency division multiplexing (OFDM) physical interface. Advantageously, eNBs 220 may directly connect to a network router, thus simplifying network architecture. eNB 220 may support certain legacy features related to physical layer procedures for transmitting and receiving, including modulation and demodulation, and channel encoding and decoding. eNB 220 may also provide radio resource control and radio mobility management for processing handovers.

EPC 202 provides several functional blocks to provide various support functions. These are described herein by way of non-limiting example only.

MME 240 provides control functions to EPC 202. MME 240 provides idle mode UE paging and tagging procedures, including retransmissions. MME 240 also provides bearer activation and deactivation support, and may choose an appropriate SGW 250 for UE 210 when UE 210 initially attaches to EPC 202 via E-UTRAN 204. After attachment, MME 240 authenticates UE 210 via HSS 244.

Non Access Stratum (NAS) signaling terminates at MME 240, and MME 240 is also responsible for generating and allocating a temporary identity for UE 210. MME 240 then verifies the authorization of UE 210 to resources on the service provider's public land mobile network (PLMN), and enforces roaming restrictions on UE 210. MME 240 is also a terminal endpoint for ciphering/integrity protection for NAS signaling, and handles security key management. MME 240 also supports lawful signal interception. MME 240 also provides control plane functions for mobility between LTE and 2G/3G networks with the S3 interface terminating at MME 240 from, for example, a 3G serving GPRS support node (SGSN). Finally, MME 240 terminates the S6a interface of HSS 244 for roaming UEs.

HSS 244 is, in an embodiment, a database server to provide home location register (HLR) and authentication center (AuC) services. The functions of the HSS include call and session establishment support, user authentication, and access authorization, by way of non-limiting example.

In an embodiment, HLR stores and updates a user subscription information database. This may include the following, by way of nonlimiting example:
  a. User identification and addressing, including the International Mobile Subscriber Identity (IMSI), Mobile Subscriber ISDN Number (MSISDN), and/or mobile telephone number.
  b. User profile information, including subscriptions and quality of service (QoS) data.

AuC generates security data from user identity keys, and provides the data to at least the HLR, and as necessary, to other functional blocks.

SGW 250 forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN Gateway 250). When UE 210 is idle, SGW 250 terminates the downlink data path and triggers paging when downlink data arrives for UE 210. SGW 250 may also store UE contexts including parameters of the IP bearer service and network internal routing information. It also performs replication of the user traffic in case of lawful interception.

PDN Gateway 260 provides connectivity from UE 210 to external packet data networks (PDNs) and provides both an entry point and exit point for UE traffic. UE 210 may simultaneously connect to more than one PDN Gateway 250, and thus may access multiple PDNs. In an example, PDN Gateway 250 provides policy enforcement, packet filtering on a per-user basis, charging support, lawful interception, and packet screening, by way of nonlimiting example.

Access Network Discovery and Selection Function (ANDSF) 262 helps UE 210 discover non-3GPP access networks, such as Wi-Fi or WIMAX, that can be used in addition to the LTE network for data communication. ANDSF 260 may provide UE 210 with rules policing the connection to such networks. ANDSF 260 may provide the following to UE, by way of non-limiting example:
  a. Inter-system mobility policy (ISMP)—network selections rules for when UE 210 has no more than one active access network connection (e.g., either LTE or Wi-Fi).
  b. Inter-system routing policy (ISRP)—network selection rules for when UE 210 has potentially more than one active access network connection (e.g., both LTE and Wi-Fi). In this case, UE 210 may employ IP flow mobility, multiple-access PDN connectivity (MAPCON), or non-seamless Wi-Fi offload according to policy and user preferences.
  c. Discovery information—a list of networks that may be available in the vicinity of UE 210, and information to help UE 210 connect to these networks.

ANDSF 262 may communicates with the UE 210 over the S14 reference point, which in some embodiments is specific to ANDSF.

PCRF 290 provides, in an embodiment, both policy decision functions (PDF) and charging rules functions (CRF).

PDF makes policy decisions. Specifically, when an IP multimedia subsystem (IMS) is set up, session initiation protocol (SIP) data include media requirements, which the terminal and proxy call session control function (P-CSCF) may exchange between themselves. During the session establishment process, the PDF may also receive those requirements from the P-CSCF and make decisions based on network operator rules. These may include, by way of non-limiting example:

a. Allowing or rejecting a media request.

b. Using new or existing PDP context for an incoming media request.

c. Checking allocation of resources against authorized resource usage.

The CRF provides operator-defined charging rules applicable to each service data flow. The CRF selects the relevant charging rules based on information provided by the P-CSCF, such as Application Identifier, Type of Stream (audio, video, etc.), or Application Data Rate, by way of nonlimiting example.

ePDG 280 secures data transmission with a UE 210 connected to EPC 202 over an untrusted, non-3GPP access. For this purpose, the ePDG acts as a termination node of IPsec tunnels established with UE 210.

Network 270 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Network 270 may also include one or more servers, firewalls, routers, switches, security appliances, antivirus servers, or other useful network devices. In this illustration, network 270 is shown as a single network for simplicity, but in some embodiments, network 270 may include a large number of networks, such as one or more enterprise intranets connected to the Internet.

Operator IP services 292 include services provided by an operator of EPC 202. Operator IP services 292 may include, or may communicatively couple to an operations support system (OSS) 234. OSS 234 provides hardware and software for monitoring, controlling, analyzing, and managing EPC 202.

Advantageously, LTE provides for self-organizing networks (SONs) (also sometimes called a self-optimizing network, which is used interchangeably). SON provides automation methods to facilitate planning, configuring, managing, optimizing, and healing a network such as EPC 202 and E-UTRAN 204.

SON may be provided in different flavors, including for example centralized SON (C-SON) 230, distributed SON (dSON) 224, and in some cases hybrid SON (hSON).

C-SON 230 provides centralized higher-level network control, with increased coordination between nodes for functions such as load balancing across a wide geographic area. In contrast, dSON 224 provides a distributed, peer-to-peer control function, in which each E-UTRAN network wirelessly receives reported parameters from other E-UTRANs, and makes autonomous decisions based on those reports. hSON (not shown in this illustration) provides a hybrid solution in which some functions are centralized and others are distributed.

Advantageously, SON provides useful functions such as:

a. Self-configuration. In a self-configuration network, new base stations are automatically configured and integrated into the network, and new features on a base station are also seamlessly integrated. When a new base station is introduced into the network and powered on, it is immediately recognized and registered by the network. The neighboring base stations then automatically adjust to provide the required coverage and capacity, as well as to avoid the interference.

b. Self-Optimization. Base station such as eNBs 220 may provide configuration parameters intended to control and/or optimize their behavior. Based on observations of both eNB 220 itself, and measurements at UE 210 or elsewhere, a SON may automatically reconfigure these parameters to enhance network efficiency. In another embodiment, SON provides automatic neighbor relations (ANR), and optimizes random access parameters or mobility robustness. In yet another embodiment, SON switches off some number of base stations at night to conserve power. These base stations may be selected to ensure that full coverage is still provided in a coverage area. Neighboring base station may reconfigure appropriate parameters to ensure full coverage and adjust to the changed network topology. If a sudden spike in demand occurs, one or more sleeping base stations may wake up almost instantaneously. This may realize significant power savings without sacrificing network Self-Healing. If a network node (such as an eNB 220) goes down, self-healing helps to mitigate the effect of the failure on the overall network. For example a SON may adjust parameters and algorithms in adjacent eNBs 220 so that they can continue to provide service to the failed eNB 220. This is in contrast to legacy networks, where substantial time and resources may need to be committed to repairs when a base station fails. With self-healing networks, the network may automatically and nearly-instantaneously self-adjust with little or no service interruption.

Figure 3:
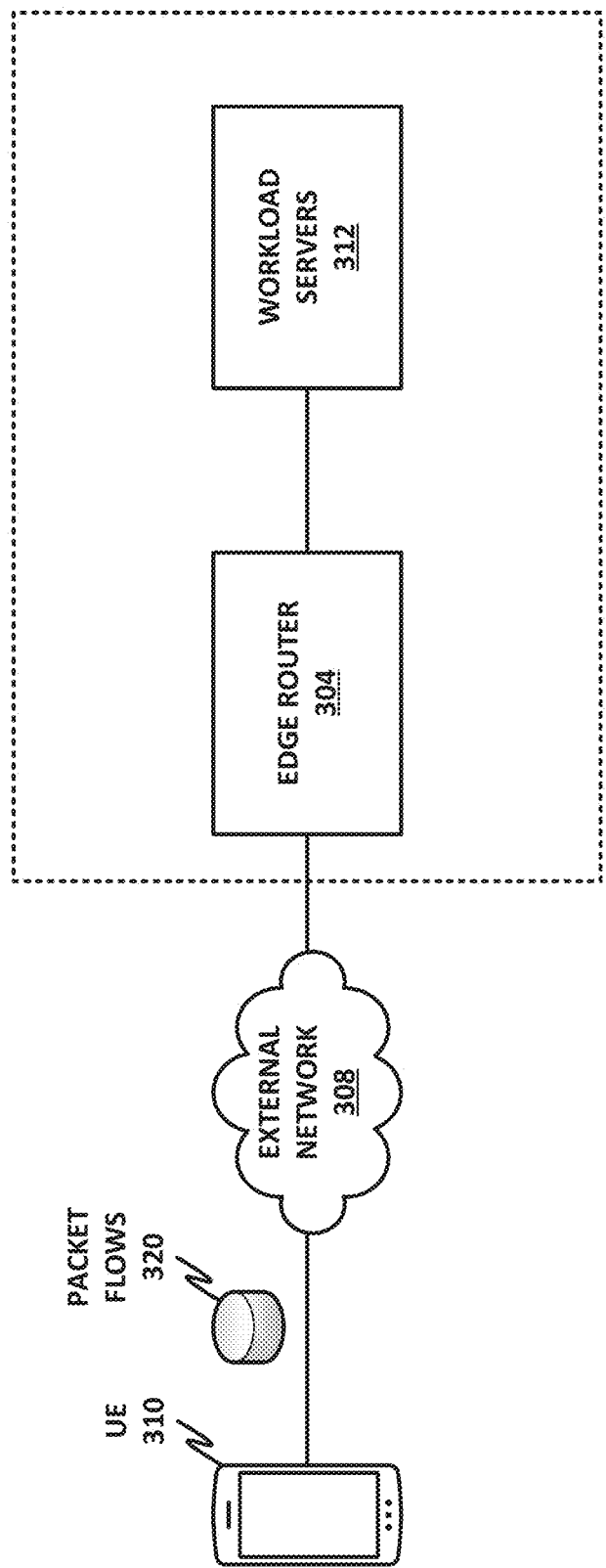
FIG. 3 is a block diagram illustrating an example network, according to one or more examples of the present specification.

FIG. 3 is a block diagram illustrating an example network according to one or more examples of the present specification.

Packet flow 320 can include data that is to be handled by SIMD or vector processing. SIMD or vector processing may be provided via external network 308, and then routed to UE 310.

SIMD or vector processing may include flows that have a common attribute, and thus may be able to be batched. Packets intended for individual end users may not arrive continuously at edge router 304. Rather, they may be interspersed with packets for other users. However, it is advantageous for edge router 304 to aggregate sequences of packets into flows or into batches based on a common attribute. This allows streamlined processing within edge router 304, as well as streamlined processing on workload servers 312 which may perform additional work, such as IP security, encryption or decryption, antivirus checking, load balancing, or other useful functions. Thus, edge router 304 may benefit from having a packet preprocessor as illustrated in the present specification.

Figure 4:
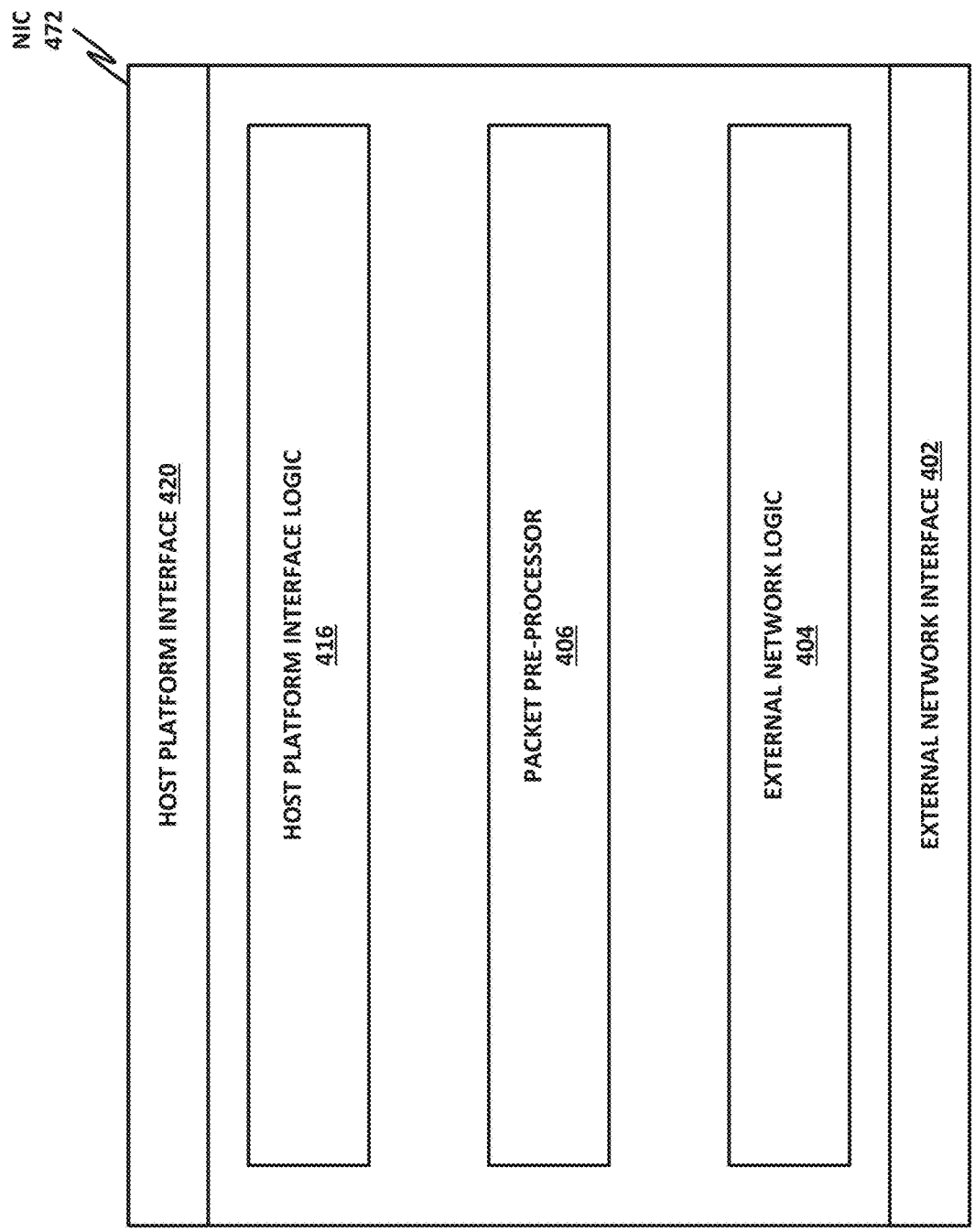
FIG. 4 is a block diagram of a network interface card (NIC) 472, according to one or more examples of the present specification.

FIG. 4 is a block diagram of a network interface card (NIC) 472 according to one or more examples of the present specification.

This NIC 472 is provided by way of nonlimiting example only. It should be noted in particular that NIC 472 may be a separate pluggable card, such as a PCIe card, or it may be tightly integrated and on-die with its host core. Furthermore, while NIC 472 is disclosed herein as the medium for hosting remote hardware acceleration functions, these functions could just as well be hosted in another part of the machine. For example, a dedicated RHA chip could be provided, which itself could be very much like a hardware accelerator. Functions could be performed on a hardware block integrated into the core, or these functions could be performed in software on the core. Thus, the disclosure of remote hardware acceleration functions on NIC 472 in this figure should be understood as a nonlimiting and illustrative example only, and the present disclosure should be understood to encompass any suitable hardware or software configuration for realizing remote hardware acceleration.

In this example, NIC 472 includes two physical interfaces, namely a host platform interface 420 and an external network interface 402.

Host platform interface 420 may provide a physical interface to a local bus on the host, such as a PCIe interface or other local interconnect. Host platform interface 420 is provided as a nonlimiting example, and it should be understood that other interconnect methods are possible. For example, in cases where NIC 472 is tightly coupled with its accompanying core, host platform interface 420 could be direct, on-die trace lines, or direct copper connections on an integrated circuit board. In other examples, a bus interface other than PCIe could be used.

External network interface 402 provides the physical interconnect to a fabric, such as fabric 170 of FIG. 1 or any of the fabrics disclosed herein. External network interface 402 may be configured to connect NIC 472 to any suitable fabric.

In one particular example, the Intel® Omni-Path™ fabric may be used. The Omni-Path™ fabric is advantageous because it allows mapping of addresses and memory ranges between different coherent domains. A system may include one or more coherent domains wherein all coherent domains are connected to each other via a fabric. Caching agents are the coherency agents within a node that process memory requests from cores within the same node, thus providing the coherency of the domain. Home agents are node clusters that are responsible for processing memory requests from the caching agents, and act as a home for part of the memory address space. A single die may have multiple homes, having a distributed address space mapping. Depending on the address space that the request targets, the request may go to the same node's local memory or they may go to a UPI agent, for example, to route the request to other processors within the same coherent domain. Alternately, a request may go through the NIC 472 to processors that are outside the coherent domain. All processors connected via the UPI belong to the same coherent domain. Thus, in one embodiment, NIC 472 may communicate with an Omni-Path™ fabric via UPI tunneling.

This communication may be facilitated via external network logic 404, which provides logic elements and instructions necessary to provide communication within a coherent domain, and across the fabric with different coherent domains. External network logic 404 may also include logic to translate local requests into remote fabric requests.

On the other hand, host platform interface logic 416 may provide logic for interfacing with the local bus, such as a PCIe bus, or a dedicated copper connection. Alternately, traffic through NIC 472 may follow a path through host platform interface 420, host platform interface logic 416, external network logic 404, and external network interface 402 out to the fabric.

Packet preprocessor 406 may be configured to provide packet preprocessing according to the teachings of the present specification. In various examples, packet streams intended for SIMD or vector processing may be identified and reordered so that they're prepared for vector or SIMD processing. Appropriate hints may be inserted into the first packet in a stream to tell a downstream application how it may treat the sequences of packets. These hints could include the nature of the packet, flow identifiers, and the value of common attributes, so that downstream applications know how to apply the SIMD or vector processing. Note that in some examples, packet streams may arrive at external network interface 402 out of order, and thus packet preprocessor 406 may, in addition to identifying packet streams, reorder them so that they're prepared for SIMD or vector processing. This increases the benefit of applying the teachings of the present specification by allowing the SIMD or vector processing to be applied to larger numbers of streams.

In various embodiments, packet preprocessor 406 may be included on NIC 472 as a software block running on a local processor, a hard or soft IP block, an application-specific integrated circuit (ASIC), optionally with appropriate memory buffers or support circuits, a field programmable gate array, or some other hardware or software solution. Furthermore, while packet preprocessor 406 is shown in this example as an inline feature of NIC 472, this need not be the case. Packet preprocessor 406 could be provided in some examples as a coprocessor that is off-board from NIC 472, or may even be provided in software running on the host platform, such as on the CPU, that performs preprocessing on the packets before they are provided to a software packet processing pipeline.

Figure 5:
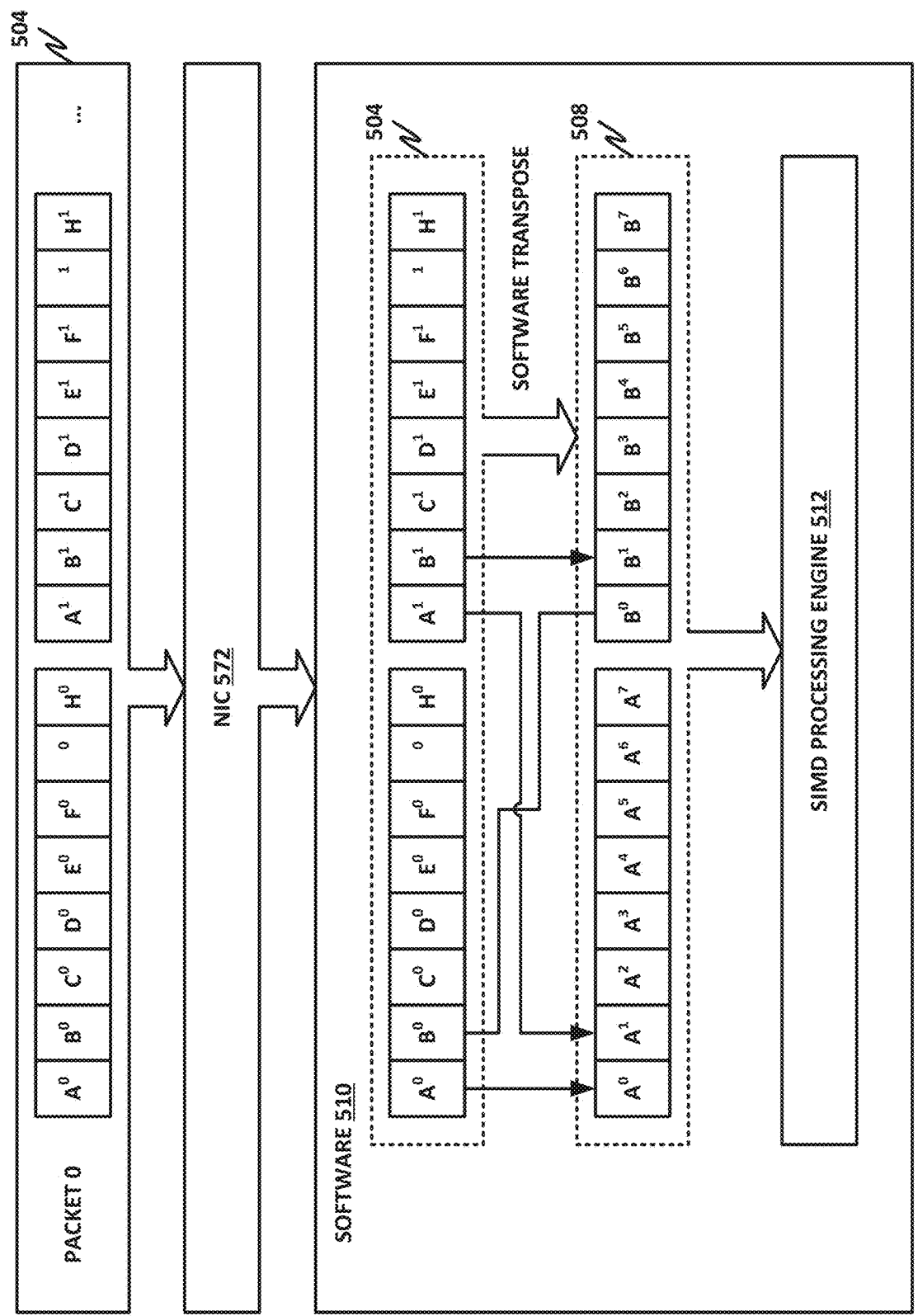
FIG. 5 is a block diagram illustrating packets to be used for vector or single instruction, multiple data (SIMD) processing, according to one or more examples of the present specification.

FIG. 5 is a block diagram illustrating packets to be used for vector or SIMD processing according to one or more examples of the present specification.

In this example, packet 0 504 includes a number of bytes. These are labeled $A^0$, $B^0$, through $H^0$, and $A^1$ through $H^1$. Additional data segments may be included. These are received by NIC 572, and forwarded to software 510.

When software 510 receives packet 504, it may reorder the data chunks within packet 504 to prepare the packet for SIMD processing. For example, software 510 may extract all of the "A" segments from a plurality of sequences, and send those for processing on a first core or thread, and may collect all of the "B" segments and forward those for processing in a second SIMD thread within a SIMD processing engine 512.

While this realizes the advantages of SIMD or vector processing, it does require software 510 to perform reordering.

Figure 6:
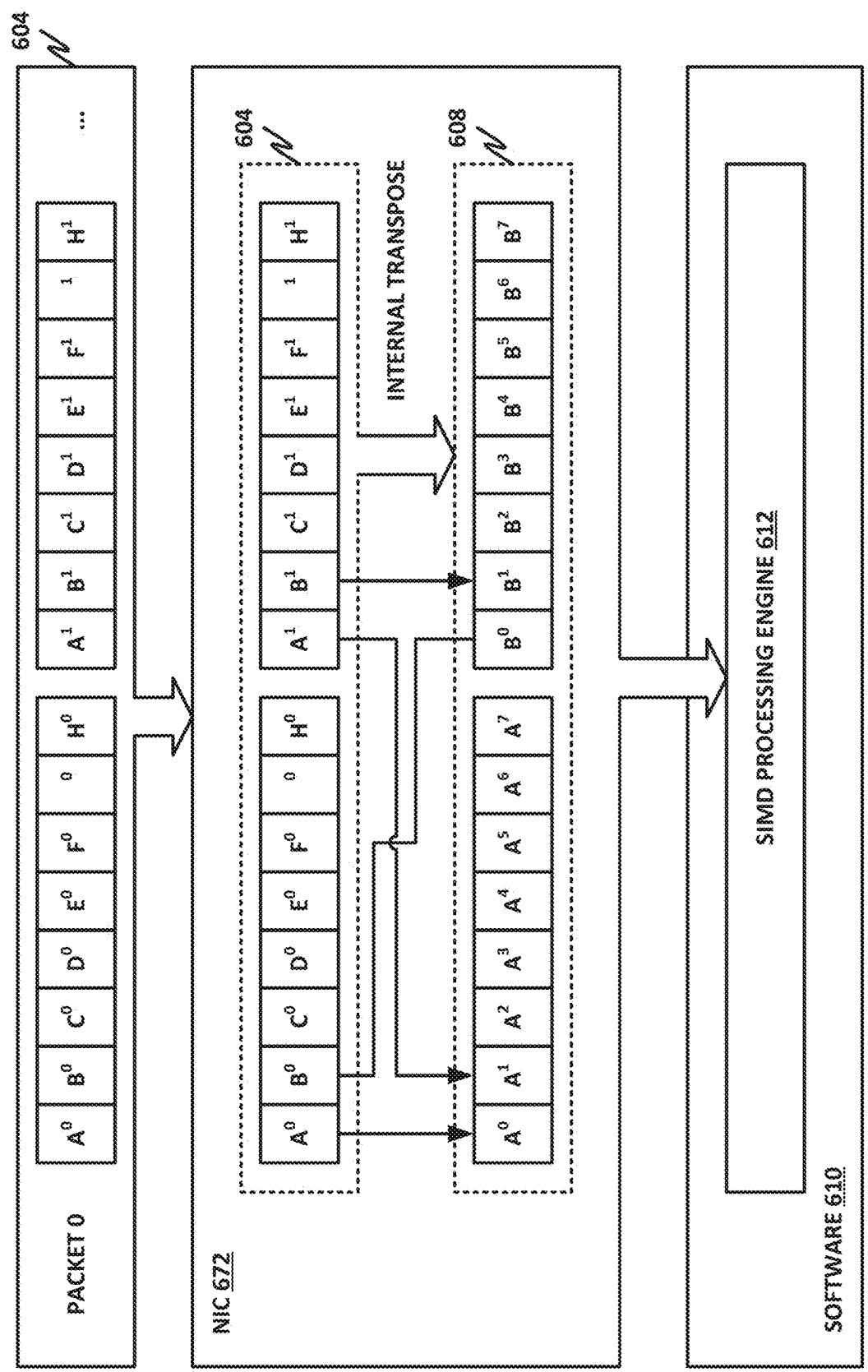
FIG. 6 is a block diagram of an embodiment where certain functions are provided on-board within a NIC, according to one or more examples of the present specification.

FIG. 6 is a block diagram of an embodiment where certain of those functions are instead provided on-board within NIC 672. Advantageously, because these functions may be provided in an ASIC, field-programmable gate array (FPGA), coprocessor, or other very fast architecture, the processing may be performed much more quickly in some embodiments. In this example, packet 0 604 is provided to NIC 672. NIC 672 performs an internal transpose of packet 604, grouping the As, Bs, Cs, and so on together preparing them for SIMD or vector processing. Once all of the data groupings have been properly formed, the modified packet 608 is provided to software 610, where it can now be natively handled by SIMD processing engine 512 without any additional reordering.

Note that this is different from inline crypto or header splitting. Header splitting does not necessarily transform the payload data itself, but rather divides a single packet into multiple fragments, or duplicate packets and descriptors. The inline operations described in this specification include transferring of data into vector, MIMD, or SIMD-friendly format for immediate processing by SIMD processing engine 612. The data may also be segmented to suit the vector instruction.

Note that because SIMD, MIMD, and vector instructions can require different formats, such as data widths, the packet preprocessor may be configured to format the data to match the target architecture capabilities.

Turning to FIG. 6, note that some applications require grouping of packet data into a single buffer to allow efficient use of SIMD instructions while working on a plurality of packets in parallel. For example, the Snow3G wireless cipher may require such a grouping.

Figure 7:
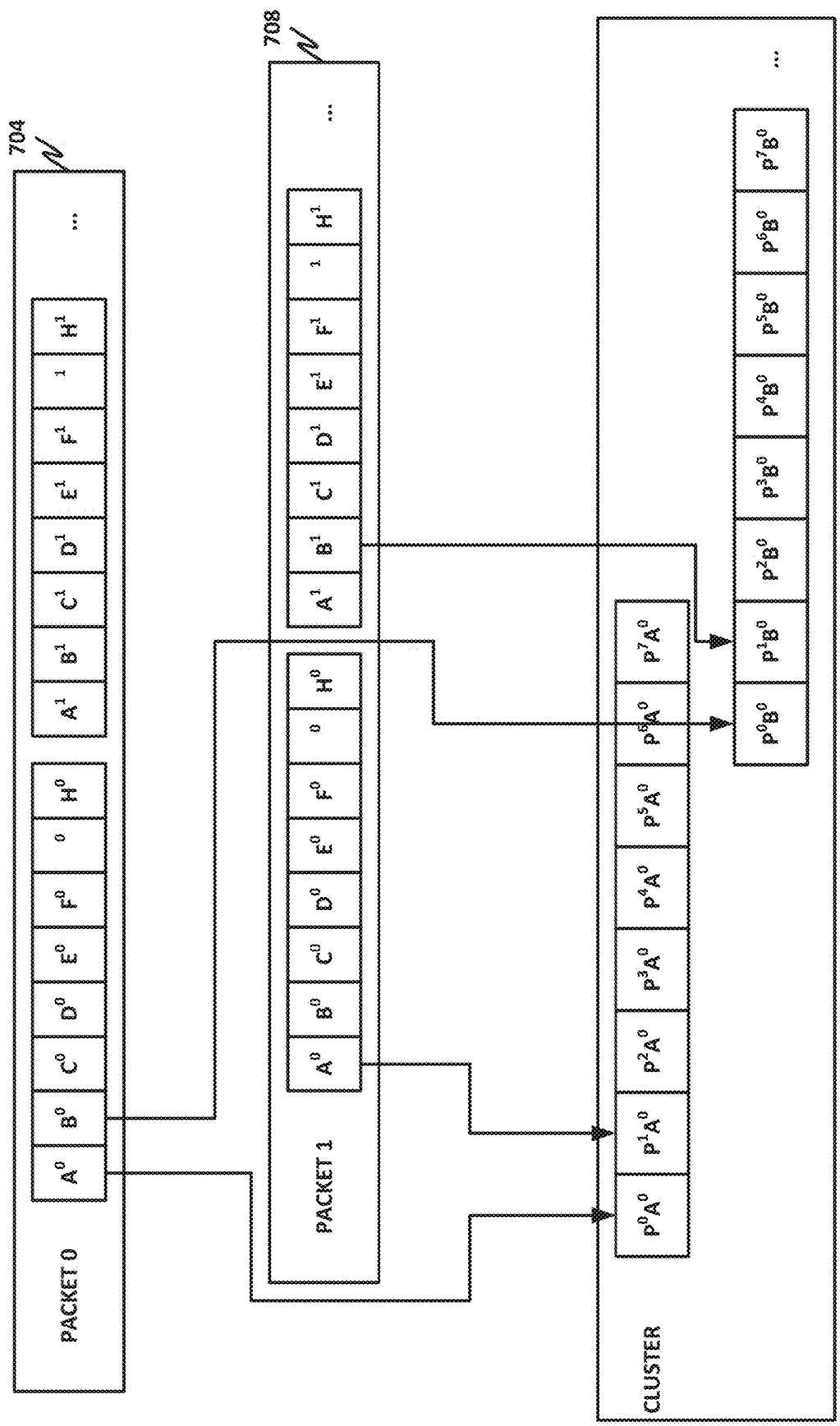
FIG. 7 illustrates how packets can be combined into a single cluster along with a number of other packets, according to one or more examples of the present specification.

FIG. 7 illustrates how a packet 0 704 and packet 1 708 can be combined into a single cluster along with a number of other packets. In the cluster, all of the A0s from all of the various packets are grouped, all of the B0s from all of the various packets are grouped, and so on.

Figure 8:
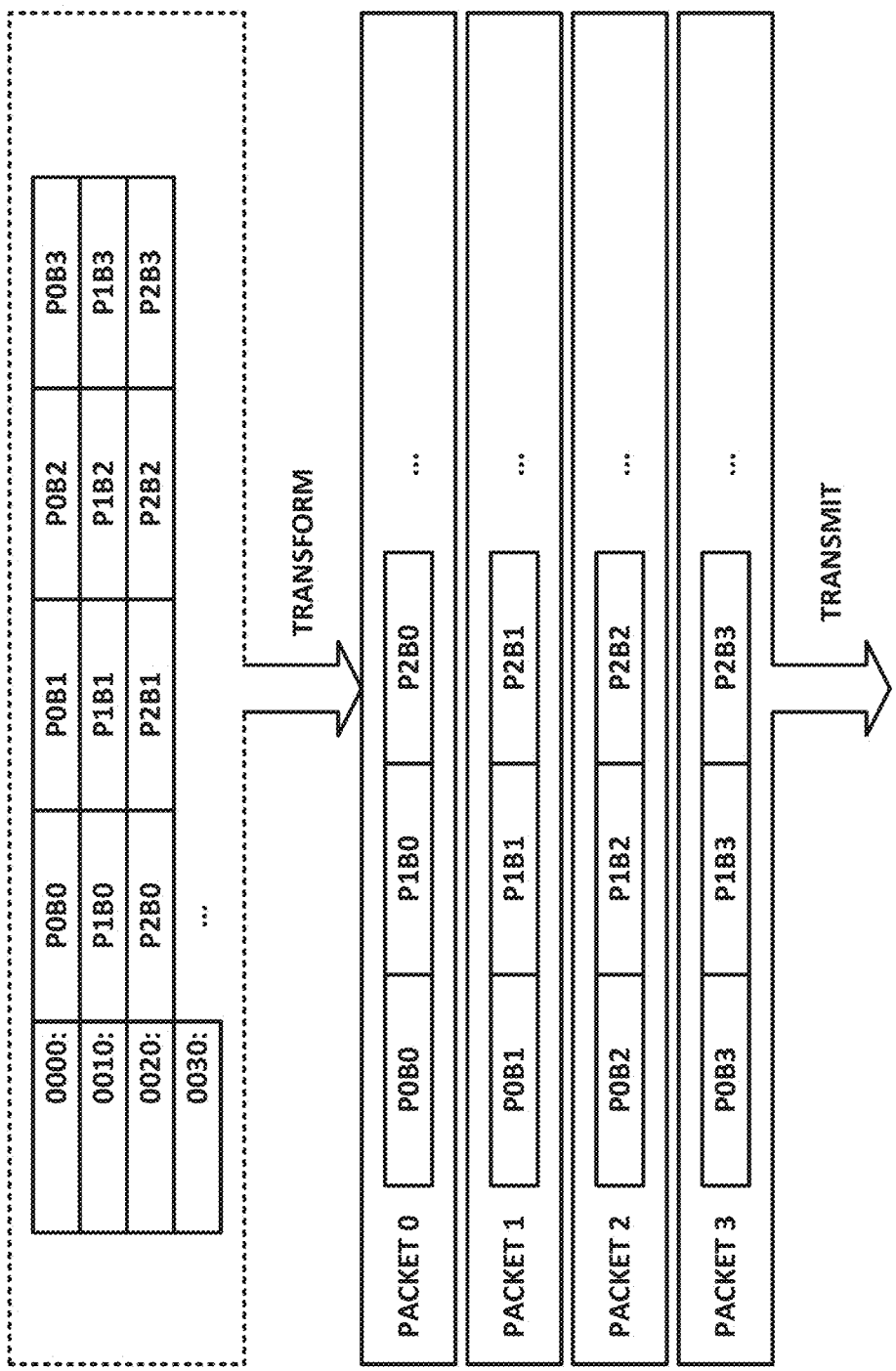
FIG. 8 is a block diagram illustrating an example wherein four packets are encrypted and transposed, according to one or more examples of the present specification.

FIG. 8 is a block diagram illustrating another example wherein four packets are encrypted and transposed, with one buffer and multiple buffer lanes, and then prepared for transmission.

In this example, packets 0, 1, 2, and 3 are provided, with each packet including buffer lanes 0 through 3. Thus, P0B0 represents "packet 0 buffer lane 0," and so on through P2B3, representing packet 2 buffer lane 3. These may be transformed so that the new packet 0 includes packet 0 buffer lane 0, packet 1 buffer lane 0, packet 2 buffer lane 0, and so on. New packet 1 includes packet 0 buffer lane 1, packet 1 buffer lane 1, packet 2 buffer lane 1, and so on. New packet 2 includes packet 0 buffer lane 2, packet 1 buffer lane 2, packet 2 buffer lane 2, and so on. New packet 3 includes packet 0 buffer lane 3, packet 1 buffer lane 3, packet 2 buffer lane 3, and so on. Thus, each output packet includes each of the same buffer lanes from the input packets. Once the packets are appropriately formatted, they may be transmitted to the appropriate application.

Figure 9:
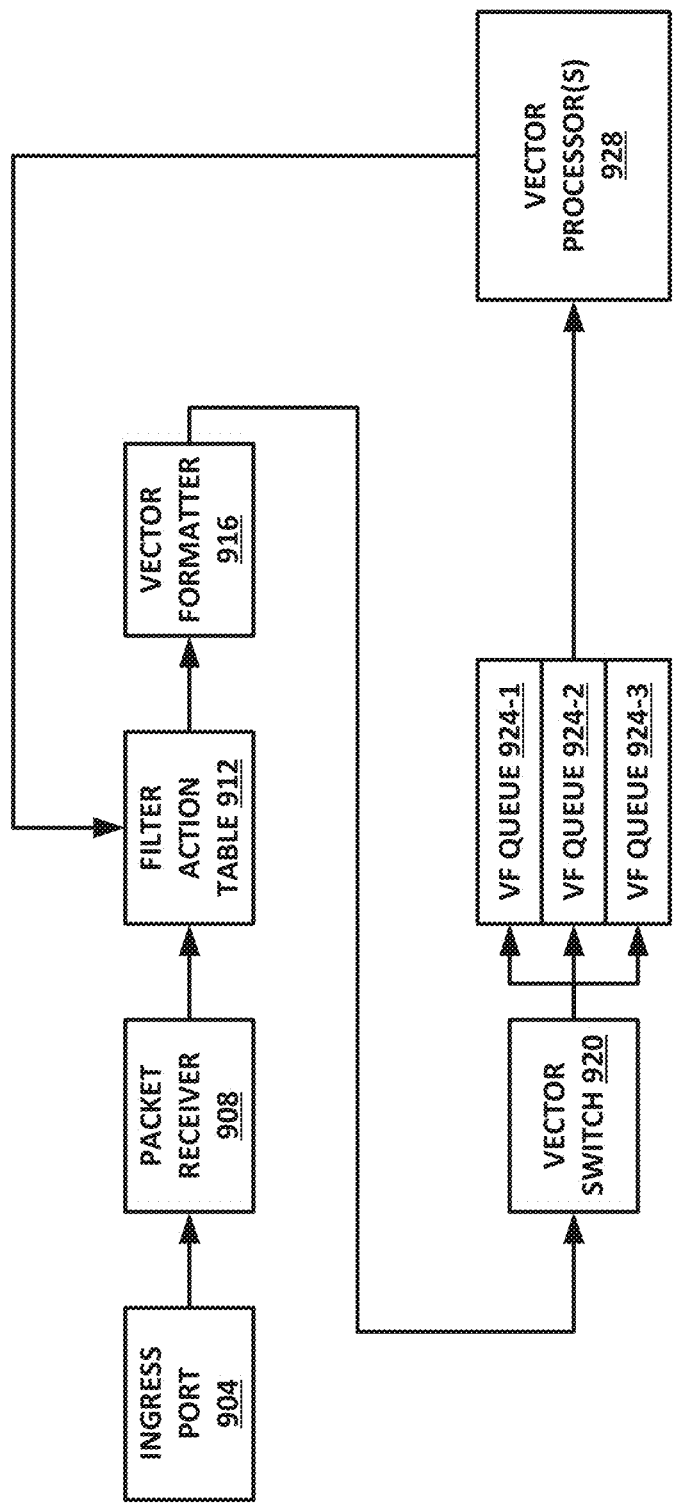
FIG. 9 is an illustration of an architecture for realizing packet preprocessing, according to one or more examples of the present specification.

FIG. 9 is an illustration of an architecture for realizing the packet preprocessing of the present specification. The packet preprocessor identifies frames and modifies incoming and outgoing identified data frames. The packet preprocessor may be placed in the NIC, or may be separate from the NIC such as in a preprocessor or in a separate software process. For example, the NIC may detect the packets that are candidates for this processing, and the preprocessor can perform the actual preprocessing, or the preprocessor may be configured to do both.

In this example, multiple ingress buffers or frames may be provided with a single egress buffer or frame. As the NIC or a packet preprocessor identifies frames depending on the rules applied, it may combine multiple frames based on a predefined pattern into a single memory location. This allows the application to specify for certain streams the packets that will be coalesced and stored in memory in a suitable format. On the other hand, in another scenario, upon transmit the SIMD application can provide to the packet preprocessor a single frame or buffer and the packet preprocessor may form multiple output buffers or frames using a predefined pattern to format the data. In other use cases where coalescing is not required, the packet preprocessor may identify a single frame and, based on a predefined pattern, modify the data before storing the data or providing it to a DMA engine for memory.

In this example, the NIC includes an ingress port 904. A packet receiver 908 receives the packet from ingress port 904.

A filter action table 912 identifies packets that need to receive vector or SIMD formatting. If they do not require any special formatting, they may be forwarded directly to the egress port, for handling by an application.

For those input packets that do require special formatting, a SIMD/vector formatter 916 is provided. The SIMD or vector formatter 916 may perform single packet data transformation for vector processing. It may also perform single packet data transformation followed by segmentation into multiple buffers, and may additionally perform multiple packet coalescing, transformation, and delivery as a single buffer.

In some embodiments, vector formatter 916 may have its own internal pipeline, and may perform a plurality of operations. For example, a first operation may include converting data from the network packet format (e.g., big-endian) to processor format (e.g., little-endian). This may be followed by data transformation to suit the SIMD/vector instructions. In some embodiments, one or more hints or tags may be prepended to the packets as metadata, indicating that the pre-processing has been performed. This ensures that the processor doesn't "undo" the pre-processing (e.g., by converting back to big-endian format). This may be handled by a single flag or signal indicating pre-processing as whole, or may have individual flags or signals for each pre-processing operations.

The output buffer of vector formatter 916 is provided to vector switch 920 which provides switching to virtual functions using a vector index. Thus, the vectors may be provided to a number of virtual function queues 924. Virtual function queues 924 may then be provided to vector processors 928, which may include information such as metadata, the original packet, and SIMD preprocessing packet data.

Once vector processor 928 processes the function, the output may again be provided to filter action table 912, and it may be determined whether the output should also be reordered before being sent back out across the network. In this case, if vector formatting is required, then vector formatter 916 may rearrange the packet so that it is suitable for transmission back out to the network.

Figure 10:
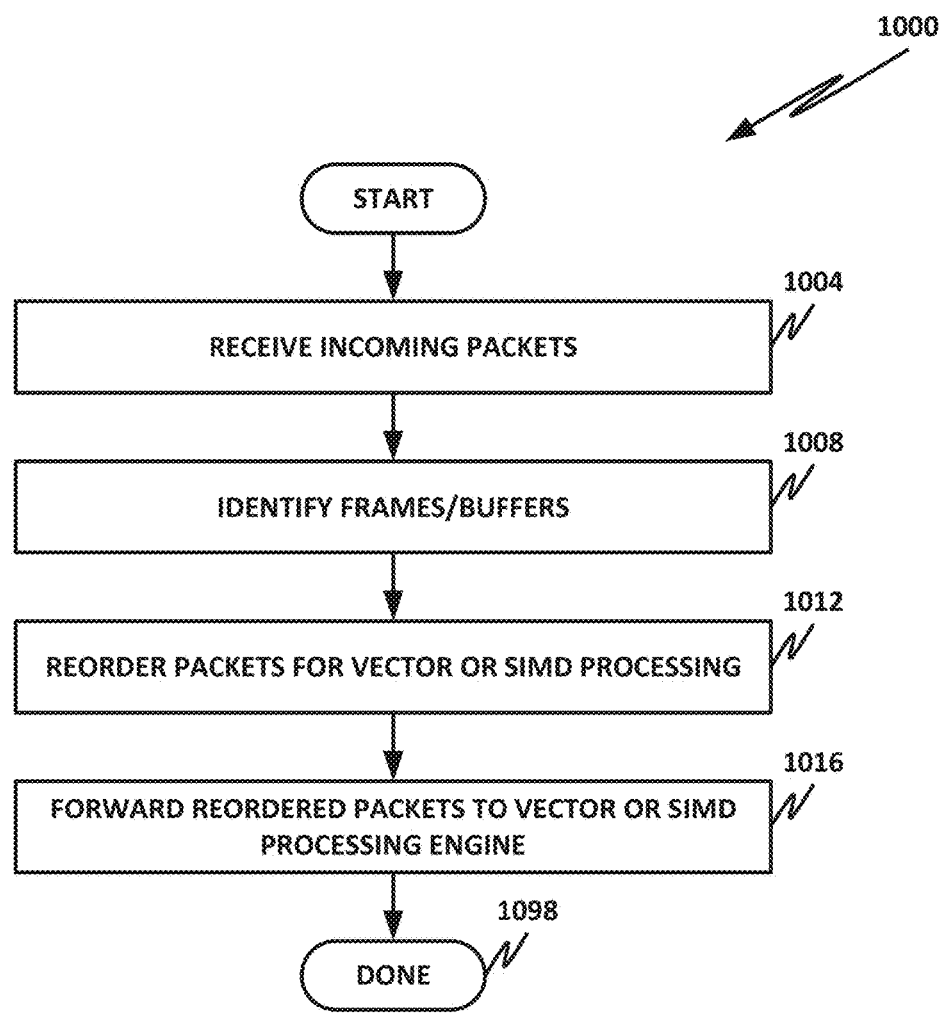
FIG. 10 is a block diagram of a method of performing packet preprocessing, according to one or more examples of the present specification.

FIG. 10 is a block diagram of a method 1000 of performing packet preprocessing according to one or more examples of the present specification.

In block 1004, the NIC receives an incoming packet as described above.

In block 1008, a functional block such as filter action table 912 of FIG. 9 may identify frames or buffers that are candidates for SIMD or vector processing.

In block 1012, a vector or SIMD formatter may reformat the packets as described in connection with FIG. 9, such as transforming a single packet for vector processing, transforming a single packet followed by segmentation into multiple buffers, or performing multiple packet coalescing with transformation and delivery as a single buffer.

In block 1016, the reordered packet is forwarded to a vector or SIMD processing engine operating on an appropriate processor.

In block 1098, the method is done.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a network interface device, comprising: an ingress interface; a host platform interface to communicatively couple to a host platform; and a packet preprocessor comprising logic to: receive via the ingress interface a data sequence comprising a plurality of discrete data units; identify the data sequence as data for a parallel processing operation; reorder the discrete data units into a reordered data frame, the reordered data frame configured to order the discrete data units for consumption by the parallel operation; and send the reordered data to the host platform via the host platform interface.

Example 2 includes the network interface of example 1, wherein the data sequence is a single data packet.

Example 3 includes the network interface of example 2, wherein reordering the discrete data units comprises segmenting the reordered data frame into a plurality of buffers.

Example 4 includes the network interface of example 1, wherein the data sequence comprises a plurality of packets, and wherein reordering comprises coalescing the plurality of packets and the reordered data frame comprises a single buffer.

Example 5 includes the network interface of example 1, wherein the packet preprocessor is further to send the data sequence to the host platform.

Example 6 includes the network interface of example 1, wherein the packet preprocessor is to provide the reordered data frame with metadata identifying the data frame as ready for consumption by the parallel processing operation.

Example 7 includes the network interface of example 1, further comprising a vector switch to switch the reordered data frame to a target core on the host platform.

Example 8 includes the network interface of example 1, further comprising a virtual queue to queue a plurality of reordered data frames to a target core of the host platform.

Example 9 includes the network interface of example 1, wherein the host platform interface comprises a configuration interface for a core of the host platform to configure the packet preprocessor.

Example 10 includes the network interface of example 1, wherein the parallel processing operation is selected from the group consisting of single-instruction-multiple-data (SIMD), multiple-instruction-multiple-data (MIMD), and vector processing.

Example 11 includes the network interface of any of examples 1-10, wherein the packet preprocessor comprises a coprocessor.

Example 12 includes a modem comprising the network interface of any of examples 1-10.

Example 13 includes the modem of example 11, wherein the modem is a DOCSIS modem.

Example 14 includes a service provider data center comprising an edge router, wherein the edge router is the DOCSIS modem of example 11.

Example 15 includes one or more tangible, non-transitory computer-readable storage mediums having stored thereon executable instructions for providing a packet preprocessor, the instructions to: provision an ingress interface; provision a host platform interface; receive via the ingress interface a data sequence comprising a plurality of discrete data units; identify the data sequence as data for a parallel processing operation; reorder the discrete data units into a reordered data frame, the reordered data frame configured to order the discrete data units for consumption by the parallel operation; and send the reordered data to a host platform via the host platform interface.

Example 16 includes the one or more tangible, non-transitory computer-readable mediums of example 15, wherein the data sequence is a single data packet.

Example 17 includes the one or more tangible, non-transitory computer-readable mediums of example 16, wherein reordering the discrete data units comprises segmenting the reordered data frame into a plurality of buffers.

Example 18 includes the one or more tangible, non-transitory computer-readable mediums of example 15, wherein the data sequence comprises a plurality of packets, and wherein reordering comprises coalescing the plurality of packets and the reordered data frame comprises a single buffer.

Example 19 includes the one or more tangible, non-transitory computer-readable mediums of example 15, wherein the instructions are further to send the data sequence to the host platform.

Example 20 includes the one or more tangible, non-transitory computer-readable mediums of example 15, wherein the instructions are further to provide the reordered data frame with metadata identifying the data frame as a ready for consumption by the parallel processing operation.

Example 21 includes the one or more tangible, non-transitory computer-readable mediums of example 15, wherein the instructions are further to provide a vector switch to switch the reordered data frame to a target core on the host platform.

Example 22 includes the one or more tangible, non-transitory computer-readable mediums of example 15, wherein the instructions are further to provide a virtual queue to queue a plurality of reordered data frames to a target core of the host platform.

Example 23 includes the one or more tangible, non-transitory computer-readable mediums of example 15, wherein the host platform interface comprises a configuration interface for a core of the host platform to configure the packet preprocessor.

Example 24 includes the one or more tangible, non-transitory computer-readable mediums of example 15, wherein the parallel processing operation is selected from the group consisting of single-instruction-multiple-data (SIMD), multiple-instruction-multiple-data (MIMD), and vector processing.

Example 25 includes the one or more tangible, non-transitory computer-readable mediums of example 15, wherein the instructions are encoded in an ASIC.

Example 26 includes the one or more tangible, non-transitory computer-readable mediums of example 15, wherein the instructions are encoded in an FPGA.

Example 27 includes the one or more tangible, non-transitory computer-readable mediums of example 15, wherein the instructions are encoded in a soft IP block.

Example 28 includes the one or more tangible, non-transitory computer-readable mediums of example 15, wherein the instructions are encoded in a hard IP block.

Example 29 includes a computer-implemented method of providing packet pre-processing, comprising: provisioning an ingress interface; provisioning a host platform interface; receiving via the ingress interface a data sequence comprising a plurality of discrete data units; identifying the data sequence as data for a parallel processing operation; reordering the discrete data units into a reordered data frame, the reordered data frame configured to order the discrete data units for consumption by the parallel operation; and sending the reordered data to a host platform via the host platform interface.

Example 30 includes the method of example 29, wherein the data sequence is a single data packet.

Example 31 includes the method of example 30, wherein reordering the discrete data units comprises segmenting the reordered data frame into a plurality of buffers.

Example 32 includes the method of example 29, wherein the data sequence comprises a plurality of packets, and wherein reordering comprises coalescing the plurality of packets and the reordered data frame comprises a single buffer.

Example 33 includes the method of example 29, further comprising sending the data sequence to the host platform.

Example 34 includes the method of example 29, further comprising providing the reordered data frame with metadata identifying the data frame as ready for consumption by the parallel processing operation.

Example 35 includes the method of example 29, further comprising providing a vector switch to switch the reordered data frame to a target core on the host platform.

Example 36 includes the method of example 29, further comprising providing a virtual queue to queue a plurality of reordered data frames to a target core of the host platform.

Example 37 includes the method of example 29, wherein the host platform interface comprises a configuration interface for a core of the host platform to configure the packet preprocessor.

Example 38 includes the method of any of examples 29-37, wherein the parallel processing operation is selected from the group consisting of single-instruction-multiple-data (SIMD), multiple-instruction-multiple-data (MIMD), and vector processing.

Example 39 includes an apparatus comprising means for performing the method of any of examples 29-38.

Example 40 includes the apparatus of example 39, wherein the means comprise a network interface.

Example 41 includes a modem comprising the network interface of example 40.

Example 42 includes the modem of example 41, wherein the modem is a DOCSIS modem.

Example 43 includes a service provider data center comprising an edge router, wherein the edge router is the DOCSIS modem of example 41.

Example 44 includes the apparatus of example 39, wherein the means comprise a coprocessor.

Example 45 includes The apparatus of example 39, wherein the means comprise an ASIC.

Example 46 includes The apparatus of example 39, wherein the means comprise an FPGA.

Example 47 includes the apparatus of example 39, wherein the means comprise a soft IP block.

Example 48 includes the apparatus of example 39, wherein the means comprise a hard IP block.

What is claimed is:

1. A network interface device, comprising:
   an ingress interface;
   a host platform interface to communicatively couple to a host platform; and
   a packet preprocessor comprising logic to:
   receive via the ingress interface a data sequence comprising a plurality of discrete data units;
   identify the data sequence as data for a parallel processing operation;
   reorder the discrete data units into a reordered data frame, the reordered data frame configured to order the discrete data units for consumption by the parallel operation; and send the reordered data to the host platform via the host platform interface.

2. The network interface of claim 1, wherein the data sequence is a single data packet.

3. The network interface of claim 2, wherein reordering the discrete data units comprises segmenting the reordered data frame into a plurality of buffers.

4. The network interface of claim 1, wherein the data sequence comprises a plurality of packets, and wherein reordering comprises coalescing the plurality of packets and the reordered data frame comprises a single buffer.

5. The network interface of claim 1, wherein the packet preprocessor is further to send the data sequence to the host platform.

6. The network interface of claim 1, wherein the packet preprocessor is to provide the reordered data frame with metadata identifying the data frame as ready for consumption by the parallel processing operation.

7. The network interface of claim 1, further comprising a vector switch to switch the reordered data frame to a target core on the host platform.

8. The network interface of claim 1, further comprising a virtual queue to queue a plurality of reordered data frames to a target core of the host platform.

9. The network interface of claim 1, wherein the host platform interface comprises a configuration interface for a core of the host platform to configure the packet preprocessor.

10. The network interface of claim 1, wherein the packet pre-processor is further to alter the endianness of the data sequence.

11. The network interface of claim 1, wherein the parallel processing operation is selected from the group consisting of single-instruction-multiple-data (SIMD), multiple-instruction-multiple-data (MIMD), and vector processing.

12. The network interface of claim 1, wherein the packet preprocessor comprises a coprocessor.

13. A modem comprising the network interface of claim 1.

14. The modem of claim 13, wherein the modem is a DOCSIS modem.

15. A service provider data center comprising an edge router, wherein the edge router is the DOCSIS modem of claim 14.

16. One or more tangible, non-transitory computer-readable storage mediums having stored thereon executable instructions for providing a packet preprocessor, the instructions to:
provision an ingress interface;
provision a host platform interface;
receive via the ingress interface a data sequence comprising a plurality of discrete data units;
identify the data sequence as data for a parallel processing operation;
reorder the discrete data units into a reordered data frame, the reordered data frame configured to order the discrete data units for consumption by the parallel operation; and
send the reordered data to a host platform via the host platform interface.

17. The one or more tangible, non-transitory computer-readable mediums of claim 16, wherein the data sequence is a single data packet.

18. The one or more tangible, non-transitory computer-readable mediums of claim 17, wherein reordering the discrete data units comprises segmenting the reordered data frame into a plurality of buffers.

19. The one or more tangible, non-transitory computer-readable mediums of claim 16, wherein the data sequence comprises a plurality of packets, and wherein reordering comprises coalescing the plurality of packets and the reordered data frame comprises a single buffer.

20. The one or more tangible, non-transitory computer-readable mediums of claim 16, wherein the instructions are further to send the data sequence to the host platform.

21. The one or more tangible, non-transitory computer-readable mediums of claim 16, wherein the instructions are further to provide the reordered data frame with metadata identifying the data frame as ready for consumption by the parallel processing operation.

22. The one or more tangible, non-transitory computer-readable mediums of claim 16, wherein the instructions are further to provide a vector switch to switch the reordered data frame to a target core on the host platform.

23. The one or more tangible, non-transitory computer-readable mediums of claim 16, wherein the instructions are further to provide a virtual queue to queue a plurality of reordered data frames to a target core of the host platform.

24. The one or more tangible, non-transitory computer-readable mediums of claim 16, wherein the host platform interface comprises a configuration interface for a core of the host platform to configure the packet preprocessor.

25. A computer-implemented method of providing packet pre-processing, comprising:
provisioning an ingress interface;
provisioning a host platform interface;
receiving via the ingress interface a data sequence comprising a plurality of discrete data units;
identifying the data sequence as data for a parallel processing operation;
reordering the discrete data units into a reordered data frame, the reordered data frame configured to order the discrete data units for consumption by the parallel operation; and
sending the reordered data to a host platform via the host platform interface.

26. The method of claim 25, wherein the data sequence is a single data packet.

* * * * *